(12) United States Patent
Johnson et al.

(10) Patent No.: US 7,943,250 B1
(45) Date of Patent: May 17, 2011

(54) ELECTROCHEMICAL CONVERSION SYSTEM FOR ENERGY MANAGEMENT

(75) Inventors: Lonnie G. Johnson, Atlanta, GA (US); James R. Muller, Decatur, GA (US)

(73) Assignee: Johnson Research & Development Co., Inc., Atlanta, GA (US)

( * ) Notice: Subject to any disclaimer, the term of this patent is extended or adjusted under 35 U.S.C. 154(b) by 1324 days.

(21) Appl. No.: 11/125,649

(22) Filed: May 10, 2005

Related U.S. Application Data (63) Continuation-in-part of application No. 10/425,067, filed on Apr. 28, 2003, now Pat. No. 7,160,639, which is a continuation-in-part of application No. 09/627,721, filed on Jul. 28, 2000, now abandoned.

(60) Provisional application No. 60/569,890, filed on May 11, 2004.

(51) Int. Cl.
  H01M 2/38 (2006.01)
  H01M 10/50 (2006.01)
  C25B 1/00 (2006.01)
  C25B 15/00 (2006.01)

(52) U.S. Cl. .......... 429/81; 429/72; 429/120; 205/345; 205/347; 205/349

(58) Field of Classification Search .................. None
  See application file for complete search history.

(56) References Cited

U.S. PATENT DOCUMENTS

| | | | |
|---|---|---|---|
| 4,040,410 A | 8/1977 | Libowitz | 126/270 |
| 4,049,877 A | 9/1977 | Saillant et al. | 429/11 |
| 4,098,958 A | 7/1978 | Bettman | 429/17 |
| 4,422,500 A | 12/1983 | Nishizaki et al. | 165/104.12 |
| 4,523,635 A | 6/1985 | Nishizaki et al. | 165/104.12 |
| 4,562,511 A | 12/1985 | Nishino et al. | 361/324 |
| 4,677,038 A | 6/1987 | Salomon | 429/17 |
| 4,692,390 A | 9/1987 | Roy et al. | 429/17 |
| 4,781,029 A | 11/1988 | Ser Vaas | 60/641.7 |
| 4,818,638 A | 4/1989 | Roy et al. | 429/20 |

(Continued)

FOREIGN PATENT DOCUMENTS

EP  0 168 062 B1  12/1981

(Continued)

OTHER PUBLICATIONS

Terry Cole, Science (vol. 221) Thermoelectric Energy Conversion with Solid Electroytes.

(Continued)

*Primary Examiner* — Patrick Ryan
*Assistant Examiner* — Cynthia Lee
(74) *Attorney, Agent, or Firm* — Baker Donelson; Dorian B. Kennedy (57) ABSTRACT

There is disclosed an electrochemical conversion system (40) for energy management which includes multi-electrochemical cells. The system 40 includes a conduit system (41), an electrical system (42), first electrochemical cell (43), a second electrochemical cell (44), a third electrochemical cell (45), a first recuperative heat exchanger (RHX) (46), and a second recuperative heat exchanger (47). The conduit system, electrical system (42), heat exchangers, and electrochemical cells are all constructed and function in the same manner as previously described. The system (40) also includes an additional, second recuperative heat exchanger (47) (RHX) to thermally isolate the third electrochemical cell from the other two. As shown, the electrochemical cells are electrically and pneumatically connected in series so that the electrical current flow and the proton flow through the electrochemical cells are balanced.

15 Claims, 4 Drawing Sheets

U.S. PATENT DOCUMENTS

| | | | |
|---|---|---|---|
| 5,139,895 A | 8/1992 | Roy et al. | 429/17 |
| 5,336,573 A | 8/1994 | Zuckerbrod et al. | 429/252 |
| 5,436,091 A | 7/1995 | Shackle et al. | 429/192 |
| 5,498,489 A | 3/1996 | Dasgupta | 424/152 |
| 5,540,741 A | 7/1996 | Gozdz et al. | 29/623.5 |
| 5,547,782 A | 8/1996 | Dasgupta et al. | 429/194 |
| 5,571,634 A | 11/1996 | Goddz | 429/192 |
| 5,584,893 A | 12/1996 | Mitchell | 29/623.5 |
| 5,588,971 A | 12/1996 | Fauteux et al. | 29/623.5 |
| 5,591,544 A | 1/1997 | Fauteux et al. | 429/209 |
| 5,597,659 A | 1/1997 | Morigaki et al. | 429/190 |
| 5,778,515 A | 7/1998 | Menon | 28/623.4 |
| 5,928,436 A | 7/1999 | Borkowski et al. | 136/205 |
| 2004/0081872 A1* | 4/2004 | Herman et al. | 429/26 |

FOREIGN PATENT DOCUMENTS

| | | |
|---|---|---|
| EP | 0 055 855 A2 | 7/1982 |
| EP | 0 071 271 A2 | 2/1983 |
| EP | 0 168 062 A2 | 1/1986 |
| EP | 0 071 271 B1 | 1/1988 |

OTHER PUBLICATIONS

Heat Pumps Using Organometallic Liquid Absorbents K. Thomas Feldman, Jr., Craig M Jensen, Kwang J. Kim, Arsalan Razani. Oxidation Reduction Reactions.

* cited by examiner

ELECTROCHEMICAL CONVERSION SYSTEM FOR ENERGY MANAGEMENT

REFERENCE TO RELATED APPLICATION

This is a continuation-in-part of U.S. Patent Application Ser. No. 60/569,890 filed May 11, 2004. This is also a continuation-in-part of U.S. patent application Ser. No. 10/425,067, filed Apr. 28, 2003, now U.S. Pat. No. 7,160,639 which is a continuation-in-part of U.S. patent application Ser. No. 09/627,721, filed Jul. 28, 2000 now abandoned.

TECHNICAL FIELD

This invention relates to the conversion of heat energy to electrical energy or electrical energy to heat energy utilizing multiple electrochemical cells.

BACKGROUND OF THE INVENTION

The conversion of heat energy or chemical energy to electrical energy, or visa-versa, may be accomplished in a variety of ways. It is known that electrochemical cells or batteries rely on redox reactions wherein electrons from a reactant being oxidized are transferred to a reactant being reduced. With the separation of the reactants from each other, it is possible to cause the electrons to flow through an external circuit where they can be used to perform work.

Electrochemical cells however have had a problem of exhausting the reactants. Although cells can be designed to be recharged by applying a reverse polarity voltage across the electrodes, such recharging requires a separate electrical source. During the recharging of the cell the cell typically is not usable.

Fuel cells have been developed in an effort to overcome problems associated with electrochemical cells. Typically, fuel cells operate by passing an ionized species across a selective electrolyte which blocks the passage of the non-ionized species. By placing porous electrodes on either side of the electrolyte, a current may be induced in an external circuit connecting the electrodes. The most common type of fuel cell is a hydrogen-oxygen fuel cell which passes hydrogen through one of the electrodes while oxygen is passed through the other electrode. The hydrogen and oxygen combine at the electrolyte-electrode interface to produce water. By continuously removing the water, a concentration gradient is maintained to induce the flow of hydrogen and oxygen to the cell.

These types of fuel cells however suffer from a number of disadvantages. These cells must be continuously supplied with a reactant in order to produce electricity continuously. Additionally, these cells produce a continuous product stream which must be removed, the removal of which may pose a problem. The porous electrodes of these fuel cells must allow the passage of the reactant entering the cell. However, over time these porous electrodes can become fouled or plugged so as to slow or even prevent the passage of the reactant. Such slowing of the reactant flow reduces the production of electricity. Lastly, the selection of an appropriate electrolyte is not always easy. The electrolyte must rapidly transport the ionized species in order to increase the current production. Frequently, the limited migration of the ionized species through the electrolyte is a limiting factor on the amount of current produced.

In an effort to avoid the problems inherent with the previously described fuel cells, thermoelectric conversion cells have been designed. These thermoelectric conversion cells utilize heat to produce a pressure gradient to induce the flow of a reactant, such as molten sodium, across a solid electrolyte. A current is generated as sodium atoms lose electrons upon entering the electrolyte and gain electrons upon leaving the electrolyte. These cells however also suffer from the plugging of the porous electrodes required to pass the sodium ions. Furthermore, the diffusion of the sodium ions through the solid electrolytes has proven to be slow, thereby limiting the amount of current produced by the cell. These cells also utilize alkali metals which is difficult to use in these types of applications because of they are highly corrosive. Lastly, these types of fuel cells operate at extremely high temperatures, typically in a range between 1,200-1,500 degrees Kelvin, thus making them impractical for many uses.

Accordingly, it is seen that a need remains for an electrochemical conversion system that does not require a continuous source of reactant, which does not require an electrolyte which may be plugged over time and which may be operated at relatively low temperatures. It is the provision of such therefore that the present invention is primarily directed.

SUMMARY OF THE INVENTION

In a preferred form of the invention an electrochemical conversion system for managing energy comprises a first electrochemical cell having a first ion conductive material, a first electrode mounted upon one side of the first ion conductive material, and a second electrode mounted upon one side of the first ion conductive material opposite the first electrode, a second electrochemical cell having a second ion conductive material, a third electrode mounted upon one side of the second ion conductive material, and a fourth electrode mounted upon one side of the second ion conductive material opposite the third electrode, and a third electrochemical cell having a third ion conductive material, a fifth electrode mounted upon one side of the third ion conductive material, and a sixth electrode mounted upon one side of the third ion conductive material opposite the fifth electrode. The system also includes a conduit system having a first conduit, second conduit and third conduit. The first conduit is in fluid communication with the first electrochemical cell second electrode and the second electrochemical cell third electrode. The second conduit is in fluid communication with the second electrochemical cell fourth electrode and the third electrochemical cell fifth electrode. The third conduit is in fluid communication with the third electrochemical cell sixth electrode and the first electrochemical cell first electrode. The system also includes a first heat exchanger for exchanging heat between the first conduit adjacent the first electrochemical cell and the third conduit adjacent the first electrochemical cell, and a second heat exchanger for exchanging heat between the first conduit adjacent the second electrochemical cell and the second conduit adjacent the second electrochemical cell. A supply of ionizable gas is contained within the conduit system and an electrical circuit coupled to the first electrode, the second electrode, the third electrode, the fourth electrode, the fifth electrode and the sixth electrode. The electrical circuit includes an electrical energy storage device.

DETAILED DESCRIPTION

Figure 1:
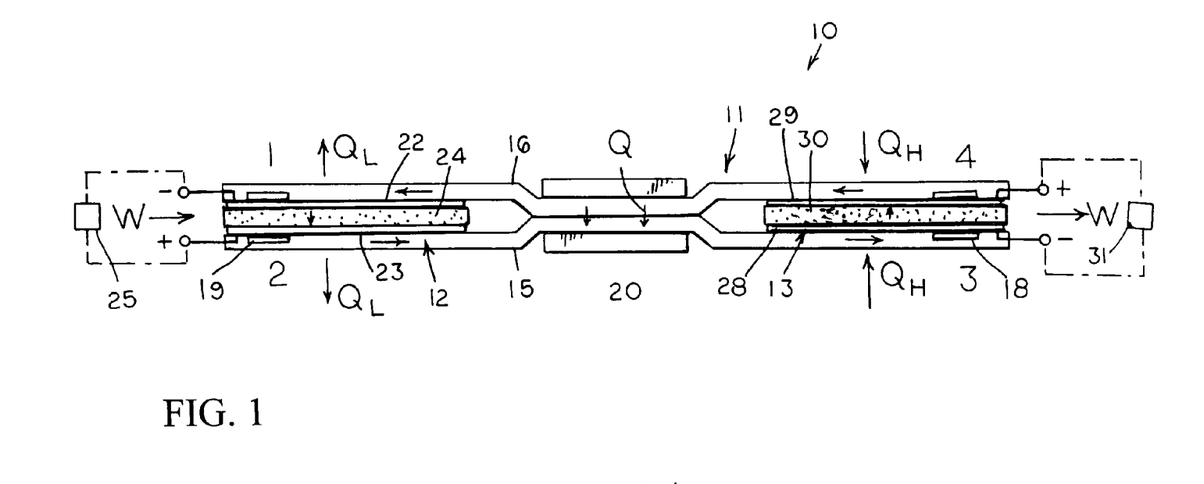
FIG. 1 is a schematic view of a reversible heat engine in a preferred form of the invention, shown in a heat engine configuration.

With reference next to the drawings, there is shown in FIG. 1 a reversible engine 10 in a preferred form of the invention of a heat engine. The engine 10 has a conduit system 11, a first electrochemical cells 12, and a second electrochemical cell 13. The conduit system 11 is made of a non-reactive material such as stainless steel. The conduit system 11 includes a first conduit 15 extending from the first electrochemical cell 12 to the second electrochemical cell 13, and a second conduit 16 extending from the second electrochemical cell 13 to the first electrochemical cell 12.

The heat engine 10 also includes a heater 18 mounted in thermal communication with the conduit system 11 adjacent the second electrochemical cell 13, a cooler 19 mounted in thermal communication with the conduit system 11 adjacent the first electrochemical cell 12, and a heat regenerator or exchanger 20 thermally coupled to the first and second conduits 15 and 16 for the transfer of heat therebetween.

The first electrochemical cell 12 has a first gas diffusion electrode 22, a second gas diffusion electrode 23 and a first proton conductive membrane 24, such as Nafion made by E.I. du Pont de Nemours, mounted between the first and second gas diffusion electrodes 22 and 23. This type of electrochemical cell is available from E-Tek, Inc. of Somerset, N.J. The electrochemical cell electrodes 22 and 23 are electrically coupled to an external power supply 25.

Similarly, the second electrochemical cell 13 has a third gas diffusion electrode 28, a fourth gas diffusion electrode 29 and a second proton conductive membrane 30 mounted between the third and fourth gas diffusion electrodes 28 and 29. The electrochemical cell electrodes 28 and 29 are electrically coupled to an external load 31.

In use, the conduit system 11 is filled with an ionizable gas, such as hydrogen, oxygen or sodium hereinafter referred to simply as hydrogen H. With the operation of the heater 18 (QH) to transfer heat energy to the second electrochemical cell 13, or adjacent thereto, to maintain a constant temperature of the hydrogen gas ionized and passed therethrough, the operation of cooler 19 (QL) to transfer heat energy from, or from adjacent thereto, the first electrochemical cell 12, and the operation of the heat exchanger 20 to transfer heat energy from the hydrogen gas within the second conduit 16 to the hydrogen gas within the first conduit 15, and the passage of an electric current from the external power supply 25 to the first electrochemical cell 12, hydrogen gas H passes through the first electrochemical cell 12. The hydrogen gas H passes through the first electrochemical cell 12 as a result of the electric potential from the external power supply 25 between the first electrode 22 and the second electrode 23. The electric potential causes the hydrogen gas at the first electrode 22 to oxidize into hydrogen protons. The oxidation of the hydrogen gas causes the release of electrons which are passed to the second electrode 23. The hydrogen protons are drawn through the first proton conductive membrane 24 to the second electrode 23 by the negative charge at the second electrode 23. At the second electrode 23 the hydrogen protons are reduced into hydrogen gas. As such, the electric current through the first electrochemical cell 12 forces the passage of hydrogen gas from the second conduit 16 to the first conduit 15, thereby increasing the hydrogen gas pressure within the first conduit 15 while decreasing the hydrogen gas pressure within the second conduit 16, i.e., creating a hydrogen gas pressure differential between the second conduit 16 and the first conduit 15.

The passage of hydrogen gas H from the second conduit 16 to the first conduit 15 causes a pressure differential across the second electrochemical cell 13. As the hydrogen pressure differential between the first and second conduits 15 and 16 increases an electrical potential across the second electrochemical cell 13 is created and progressively increased. Hydrogen gas H at the higher pressure first conduit 15 adjacent the second electrochemical cell third electrode 28 is oxidized into hydrogen protons. These hydrogen protons are forced by the hydrogen pressure differential through the second proton conductive membrane 30 to the fourth electrode 29 at the lower pressure second conduit 16. At the fourth electrode 29 the hydrogen protons are reduced into hydrogen gas. As such, the oxidation of the hydrogen gas causes the release of electrons which are passed to the third electrode 28 while the reduction of protons into hydrogen gas causes the acceptance or receiving of electrons from the fourth electrode 29, thereby inducing an electric current through load 31 coupled to the second electrochemical cell 13.

The passage of hydrogen gas through the first and second electrochemical cells 12 and 13 creates a fluid stream or flow through the conduit system 11 as illustrated by the direction arrows in the drawings. The flow of hydrogen gas through the first conduit 15 from adjacent the first electrochemical cell 12 to adjacent the second electrochemical cell 13 is done so under constant pressure while the temperature of the gas increases. Similarly, the flow of hydrogen gas through the second conduit 16 from adjacent the second electrochemical cell 13 to adjacent the first electrochemical cell 12 is done so under constant pressure while the temperature decreases.

It should be understood that it takes less work to transfer the hydrogen gas across the first electrochemical cell from the low pressure region to the high pressure region at a low temperature than the work required to transfer the hydrogen gas across the second electrochemical cell from the high pressure region to the low pressure region at a high temperature. As such, the work input at the first electrochemical cell is less than the work output at the second electrochemical cell, with the additional work output energy being obtained from the conversion of the heat energy input (QH). The transfer of heat through the heat exchanger 20 aids in maintaining a temperature differential between the regions of the conduit system surrounding the two electrochemical cells 12 and 13 and thereby aid in maintaining a constant pressure during the process, and in improving the efficiency by conserving the heat energy within the system by transferring it from the high temperature gas leaving the high temperature region adjacent the second electrochemical cell to the lower temperature gas flowing to the first electrochemical cell.

Figure 2:
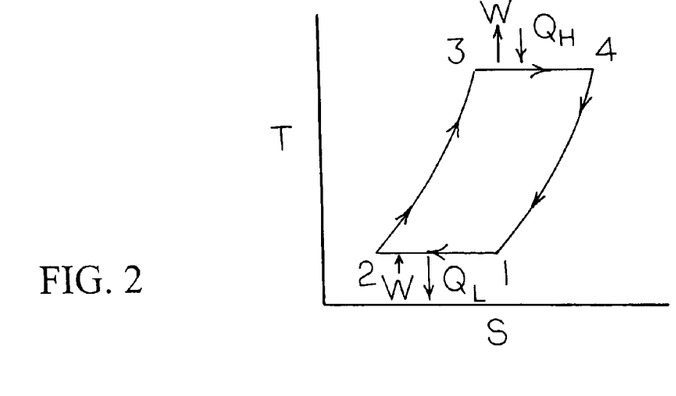
FIG. 2 is a theoretical, temperature entropy diagram of the reversible heat engine of FIG. 1.

The entropy diagram shown in FIG. 2 illustrates the theoretical change in entropy of the just described system during its operation in an ideal or perfect situation wherein the heat exchange is ideal or 100 percent efficient, i.e., wherein outside influences on the system are not considered. Obviously, the true entropy diagram of the system will be different once these outside influences are taken into consideration.

Figure 3:
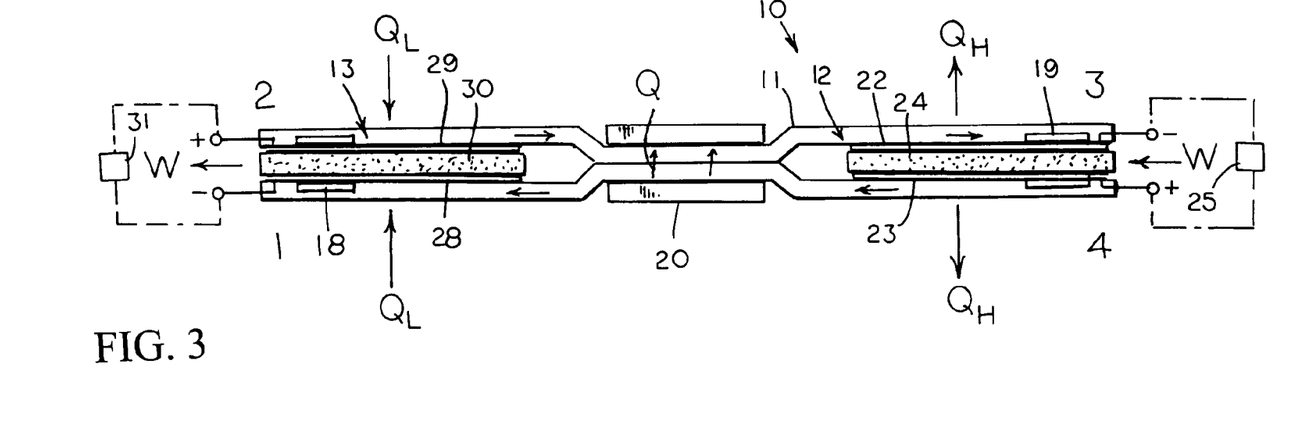
FIG. 3 is a schematic view of a reversible heat engine in a preferred form of the invention, shown in a heat pump configuration.
Figure 4:
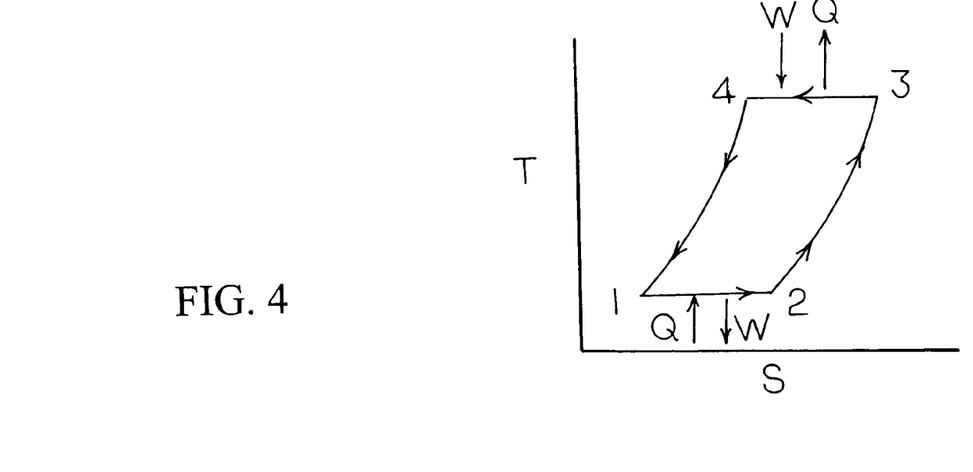
FIG. 4 is a temperature entropy diagram of the reversible heat engine of FIG. 3.

The system may also be operated in a reverse cycle as a heat pump, as shown in FIGS. 3 and 4. Here, the second electrochemical cell 13 is coupled to an external power supply 25 while the first electrochemical cell 12 is coupled to an external load 31. Also, the region adjacent the first electrochemical cell 12 is provided with heat energy (QL) by while heat energy is extracted (QH) from the region adjacent the second electrochemical cell 13. The operation of the device in this configuration is the extraction of heat energy (QL) from a low temperature source and supply it as heat energy (QH) to a higher temperature source, as illustrated in FIG. 3. The principles of the invention however remain the same as those previously described, with the system here providing a change in the heat energy.

The system may be operated at relatively small temperatures differences. As such, this system is both safe and manageable. Furthermore, this system converts energy without any mechanically moving parts, and as such is practically free of mechanical failure.

It should be understood that the previously described systems may utilize any form of heat source such as electric heaters, gas burning heaters, heated air, radiation heat sources, radiant heaters or other conventionally known means of producing heat. The system may also utilize any form of cooling means such as cooling water jackets, heat sinks, cooling radiators, heat dissipaters or another other conventionally known means of removing heat.

Figures 5, 6:
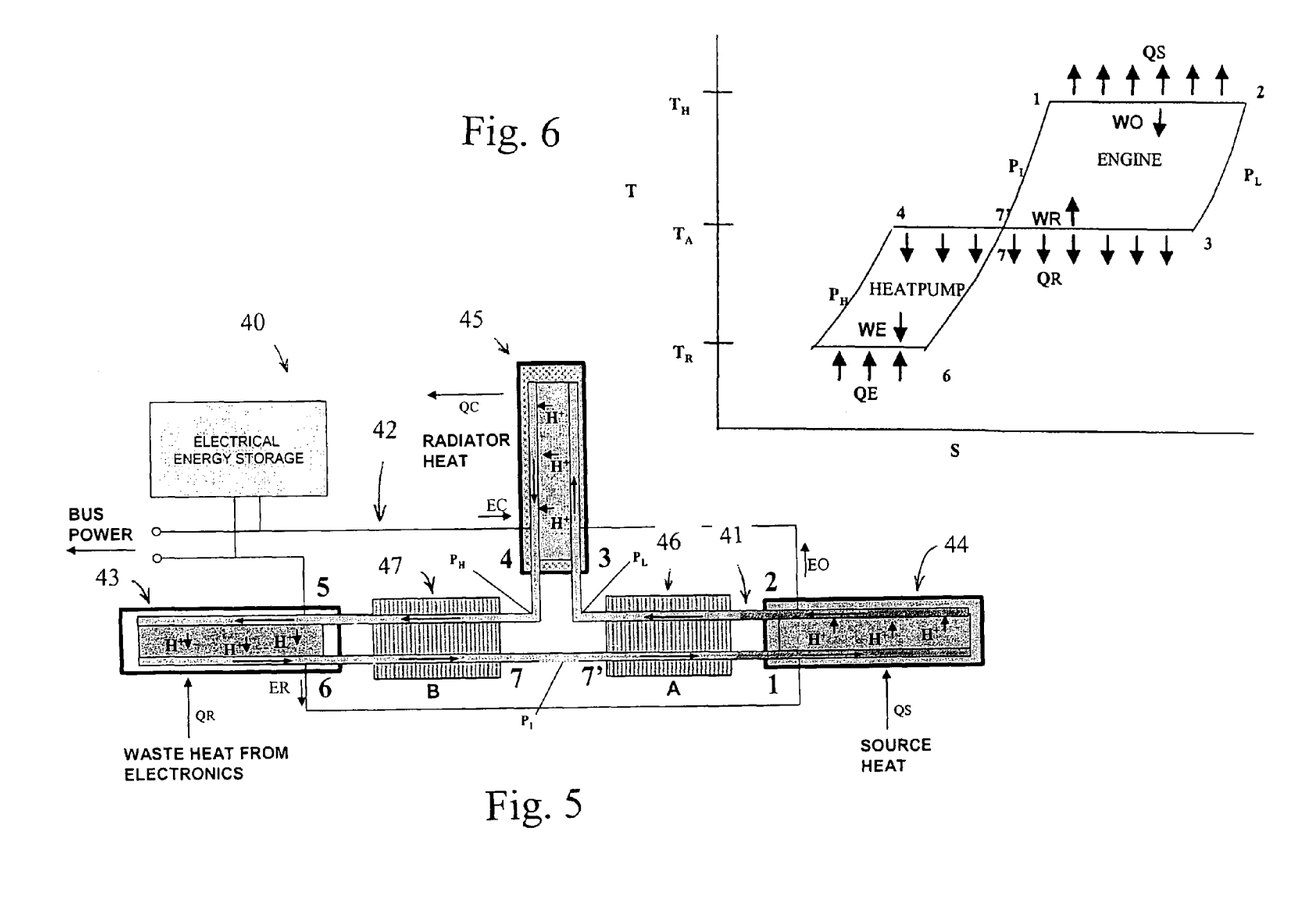
FIG. 5 is a schematic view of an electrochemical conversion system for energy management in a preferred form of the invention.
FIG. 6 is a temperature entropy diagram of the reversible heat engine of FIG. 5.

With reference next to FIG. 5, there is shown an electrochemical conversion system 40 for energy management which includes multi-node (three or more stacks) or electrochemical cells. The three-node system 40 (a thermally driven heat pump) is described in detail to provide a stepping-stone for multi-node (>3 nodes) operation. Principles for the thermally driven heat pump apply equally to all multi-node electrochemical conversion systems.

The system 40 is an innovative, solid-state heat engine which can operate on any thermal source, such as combustible fuels, concentrated solar energy, waste heat, or geothermal. In addition to power generation, the electrochemical conversion systems can be configured as a heat pump or as a combination heat pump/heat engine to provide thermal management for heating, cooling and electrical energy. Operating on the Ericsson cycle and using hydrogen as a working fluid, the electrochemical conversion system can efficiently transport heat to or from a desired location to effectively maintain a desired elevated or reduced temperature. The Ericsson cycle is Carnot equivalent, and therefore, offers the maximum theoretical efficiency available from an engine operating between two temperatures. The electrochemical conversion system uses electrochemical cells, also referred to as Membrane Electrode Assemblies (MEA), similar to those used in fuel cells; however, it does not require oxygen or a fuel supply, only heat.

The three-node system 40 is a thermally driven heat pump and is shown in FIG. 5 along with a Temperature-entropy (T-s) diagram of the cycle shown in FIG. 6. The thermodynamic states on the T-s diagram correspond to the same locations in the thermally driven heat pump schematic.

The system 40 includes a conduit system 41, an electrical system 42, first electrochemical cell 43, a second electrochemical cell 44, a third electrochemical cell 45, a first recuperative heat exchanger (RHX) 46, and a second recuperative heat exchanger 47. The conduit system 41, electrical system 42, heat exchangers, and electrochemical cells are all constructed and function in the same manner as previously described.

This version of the system 40 includes an additional, second recuperative heat exchanger 47 (RHX) (the two node system of FIGS. 1 and 3 include a single RHX) to thermally isolate the third electrochemical cell 45 or node from the other two, and an interface with the ambient environment for heat exchange (labeled as $Q_C$ at temperature $T_A$), a high temperature interface for heat exchange (labeled as $Q_S$, at temperature $T_H > T_A$), and an interface to the refrigerated space for heat exchange (labeled as $Q_R$ at $T_R < T_A$). As shown, the electrochemical cells 43, 44 and 45 are electrically and pneumatically connected in series so that the electrical current flow and the proton flow through the electrochemical cells are balanced.

Beginning at high temperature intermediate pressure state 1, electrical energy $E_O$ is generated at the high temperature MEA as hydrogen expands from state 1 to high temperature low-pressure state 2. The temperature of the hydrogen is maintained nearly constant by supplying heat $Q_S$ from the source during the expansion process. The thin membrane (less than 10 μm thick) within the electrochemical cell will not support a significant temperature gradient, so the near isothermal assumption for the process is valid, provided adequate heat is transferred from the membrane through its substrate. From state 2 to state 3, the hydrogen passes through the first recuperative heat exchanger (RHX) 46 under approximately constant pressure and is cooled by transferring heat to hydrogen flowing in the opposite direction to ambient temperature. From ambient temperature, low-pressure state 3, electrical energy (labeled as $E_C$) is consumed as hydrogen is compressed nearly isothermally across the ambient temperature, third electrochemical cell 45 to high pressure, ambient temperature state 4. Heat $Q_C$ generated during the compression process is rejected to the ambient environment to maintain the isothermal process. From ambient temperature, high-pressure state 4 the hydrogen passes through the second recuperative heat exchanger to low temperature, high-pressure state 5. The hydrogen flowing from state 4 to 5 is cooled by transferring heat to the hydrogen flowing in the opposite direction through the second recuperative heat exchanger flowing from the low temperature, first electrochemical cell 43 (state 6 to 7). Refrigeration is accomplished at the low temperature, first electrochemical cell 43 by extracting heat $Q_R$ from the low temperature environment as hydrogen expands from low temperature, high-pressure state 5 to low temperature, low-pressure state 6 thereby generating energy $E_R$. From state 6 to state 7, hydrogen flows through the second recuperative heat exchanger 47 wherein its temperature is increased by heat transfer from the hydrogen passing from state 4 to 5. The hydrogen continues through the first recuperative heat exchanger 46, where it is heated by hydrogen leaving the high temperature, second electrochemical cell 44 to return to high temperature, high-pressure state 1 completing the cycle.

Figure 7:
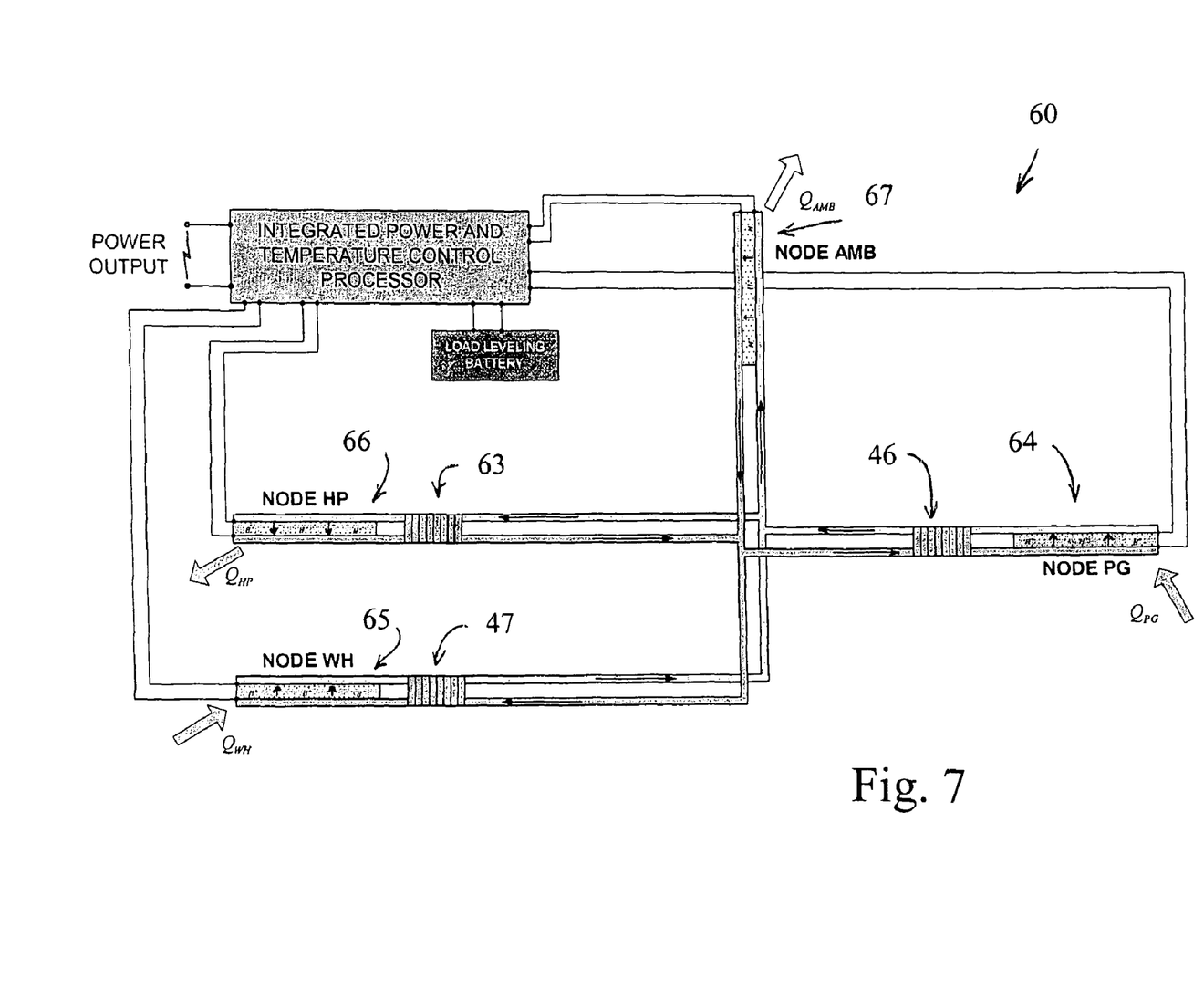
FIG. 7 is a schematic view of another electrochemical conversion system for energy management in a preferred form of the invention.

With reference next to FIG. 7, there is shown a four-node electrochemical conversion system 60 in another preferred form of the invention. It should be noted that the electrochemical convention system of the present invention can be configured with N total nodes, where M (which must be less than N) of the nodes are connected to sources or sinks at non-ambient temperatures and at least one node interfaces with the ambient environment to satisfy thermodynamic requirements for a heat engine. The multi-node system can be designed for nearly any thermal management issues, and overall operation will of course depend on the number of nodes and the amount of heat available.

The four node system 60, is similar to the three-node system of FIGS. 5 and 6 except for the addition of a fourth electrochemical cell, the details of which will follow, and a third recuperative heat exchanger 63. Here, the system 60 includes a high temperature power generation electrochemical cell 64, a waste heat power generation electrochemical cell 65, a heat pump electrochemical cell 66, and an ambient interface electrochemical cell 67. Electrochemical cell 64 may operate on combustion or some other high quality heat source (concentrated solar, high quality waste heat, etc.), while electrochemical cell 65 may operate on a lower quality waste heat source, e.g. electronics. Electrochemical cell 66 can be used to provide space heating, while the electrochemical cell 67 rejects heat to the ambient as required for a heat engine or heat pump. All nodes or electrochemical cells do not need to operate simultaneously or at the same voltage and current, which is why the schematic shows a control processor and load leveling battery. The control processor ensures that proper voltages and currents are maintained at proper values, while the load leveling battery is used (as the name implies) to level the system loads for any combination of operating electrochemical cells.

It thus is seen that an electrochemical conversion system for heat management is now provided which is efficient. It should of course be understood that many modifications, in addition to those specifically recited herein, may be made to the specific embodiments described herein without departure from the spirit and scope of the invention as set forth in the following claims.

The invention claimed is:

1. An electrochemical conversion system for managing energy comprising:
   a first electrochemical cell having a first ion conductive material, a first electrode mounted upon one side of said first ion conductive material, and a second electrode mounted upon one side of said first ion conductive material opposite said first electrode;
   a second electrochemical cell having a second ion conductive material, a third electrode mounted upon one side of said second ion conductive material, and a fourth electrode mounted upon one side of said second ion conductive material opposite said third electrode;
   a third electrochemical cell having a third ion conductive material, a fifth electrode mounted upon one side of said third ion conductive material, and a sixth electrode mounted upon one side of said third ion conductive material opposite said fifth electrode;
   said first, second and third electrochemical cells being structurally distinct from each other,
   a conduit system having a first conduit, second conduit and third conduit, said first conduit being in fluid communication with said first electrochemical cell second electrode and said second electrochemical cell third electrode, said second conduit being in fluid communication with said second electrochemical cell fourth electrode and said third electrochemical cell fifth electrode, said third conduit being in fluid communication with said third electrochemical cell sixth electrode and said first electrochemical cell first electrode, said first, second and third conduits each being structurally separate and distinct from each other so as to be physically different structures from each other;
   a first heat exchanger for exchanging heat between said first conduit adjacent said first electrochemical cell and said third conduit adjacent said first electrochemical cell;
   a second heat exchanger for exchanging heat between said first conduit adjacent said second electrochemical cell and said second conduit adjacent said second electrochemical cell;
   a supply of ionizable gas contained within said conduit system to be used for ionization purposes only within said first, second and third electrochemical cells, and
   an electrical circuit coupled to said first electrode, said second electrode, said third electrode, said fourth electrode, said fifth electrode and said sixth electrode.

2. The electrochemical conversion system of claim 1 wherein said first and second ion conductive materials are proton conductive membranes.

3. The electrochemical conversion system of claim 1 wherein said ionizable gas is selected from a group consisting of oxygen, hydrogen and sodium.

4. An electrochemical conversion system comprising:
   a first electrochemical cell;
   a second electrochemical cell;
   a third electrochemical cell;
   said first, second and third electrochemical cells being structurally distinct from each other,
   a closed loop conduit system, said conduit system having a first conduit joining in fluid communication said first electrochemical cell with said second electrochemical cell, a second conduit joining in fluid communication said second electrochemical cell with said third electrochemical cell, and a third conduit joining in fluid communication said third electrochemical cell with said first electrochemical cell, said first, second and third conduits each being structurally separate and distinct from each other so as to be physically different structures from each other;
   an electrical circuit coupled to said first electrochemical cell, said second electrochemical call, and said third electrochemical cell; and
   a supply of ionizable gas contained within said conduit system to be used for ionization purposes only within said first, second and third electrochemical cells.

5. The electrochemical conversion system of claim 4 wherein said first, second and third electrochemical cells each include a pair of electrodes separated from each other by an ion conductive material.

6. The electrochemical conversion system of claim 5 wherein said ion conductive material is a proton conductive membranes.

7. The electrochemical conversion system of claim 4 wherein said ionizable gas is selected from a group consisting of oxygen, hydrogen and sodium.

8. The electrochemical conversion system of claim 4 further comprising a first heat exchanger thermally coupled to said first conduit and said second conduit, whereby heat is transferred between the first and second conduits.

9. The electrochemical conversion system of claim 4 further comprising a fourth electrochemical cell coupled to said first conduit and said second conduit.

10. The electrochemical conversion system of claim 4 wherein said first heat exchanger is coupled to said first and second conduits adjacent said first electrochemical cell, and wherein said electrochemical conversion system further comprising a second heat exchanger thermally coupled to said first conduit and said second conduit adjacent said second electrochemical cell.

11. The electrochemical conversion system of claim 10 further comprising a fourth electrochemical cell coupled to said first conduit and said second conduit, and wherein said electrochemical conversion system further comprises a third heat exchanger coupled to said first and second conduits adjacent fourth electrochemical cell.

12. An electrochemical conversion system for managing energy comprising:
- a first electrochemical cell having a first ion conductive material, a first electrode mounted upon one side of said first ion conductive material, and a second electrode mounted upon one side of said first ion conductive material opposite said first electrode;
- a second electrochemical cell having a second ion conductive material, a third electrode mounted upon one side of said second ion conductive material, and a fourth electrode mounted upon one side of said second ion conductive material opposite said third electrode;
- a third electrochemical cell having a third ion conductive material, a fifth electrode mounted upon one side of said third ion conductive material, and a sixth electrode mounted upon one side of said third ion conductive material opposite said fifth electrode;
- a fourth electrochemical cell having a fourth ion conductive material, a seventh electrode mounted upon one side of said fourth ion conductive material, and a eighth electrode mounted upon one side of said fourth ion conductive material opposite said seventh electrode;
- said first, second, third and fourth electrochemical cells being structurally distinct from each other;
- a conduit system having a first conduit and second conduit, said first conduit being in fluid communication with one electrode of said first electrochemical cell, one electrode of said second electrochemical cell, one electrode of said third electrochemical cell, and one electrode of said fourth electrochemical cell, said second conduit being in fluid communication with the other electrode of said first electrochemical cell, the other electrode of said second electrochemical cell, the other electrode of said third electrochemical cell, and the other electrode of said fourth electrochemical cell, said first conduit and said second conduit being structurally separate and distinct from each other so as to be physically different structures from each other;
- a first heat exchanger for exchanging heat between said first conduit and said second conduit in a position adjacent said first electrochemical cell;
- a second heat exchanger for exchanging heat between said first conduit and said second conduit in a position adjacent said second electrochemical cell;
- a third heat exchanger for exchanging heat between said first conduit and said second conduit in a position adjacent said third electrochemical cell;
- a supply of ionizable gas contained within said conduit system, and
- an electrical circuit coupled to said first electrochemical cell, said second electrochemical cell, said third electrochemical cell, and said fourth electrochemical cell.

13. The electrochemical conversion system of claim 12 wherein said first, second, third and fourth electrochemical cells each include a pair of electrodes separated from each other by an ion conductive material.

14. The electrochemical conversion system of claim 13 wherein said ion conductive material is a proton conductive membranes.

15. The electrochemical conversion system of claim 12 wherein said ionizable gas is selected from a group consisting of oxygen, hydrogen and sodium.

* * * * *